April 6, 1943.  L. W. LESSLER  2,316,006

SHUTTER RELEASE FOR FOLDING CAMERAS

Filed May 7, 1941

LEW W. LESSLER
INVENTOR

BY
ATTORNEYS

Patented Apr. 6, 1943

2,316,006

UNITED STATES PATENT OFFICE 2,316,006

SHUTTER RELEASE FOR FOLDING CAMERAS

Lew W. Lessler, Binghamton, N. Y., assignor to General Aniline & Film Corporation, New York, N. Y., a corporation of Delaware Application May 7, 1941, Serial No. 392,243

4 Claims. (Cl. 95—53)

The present application involves a shutter release for folding cameras, and more particularly a shutter release of the type in which an operating member on the camera body is automatically retracted when the camera bed is moved to its closed position.

Various constructions have been proposed for folding cameras, to connect the shutter trigger on the usual extendable and retractable camera front with an operating member mounted on the camera body. These cameras are easy to operate, since the user can release the shutter by pushing the operating member on the body without the necessity of reaching out to the camera front for this purpose.

According to some of the prior body shutter release mechanisms, means have been provided to retract the operating member so that it is substantially flush with the camera casing when the camera is closed. In the prior methods for achieving this automatic retraction, the necessary parts have been mounted near the camera bed hinge and have suffered from poor leverage in many cases.

With these defects of the prior art in view, it is accordingly one object of the present invention to provide a retractable body shutter release for folding cameras.

Another object is to provide means for retracting a body shutter release where the connection between the body release and the shutter includes a movable member mounted near the end of the folding camera bed.

A further object is to provide a control member on the camera body at a point remote from the camera bed hinge for engaging one of the shutter operating levers to retract the body release when said bed is closed.

Other objects and advantages of this invention will be apparent from the following description.

One form of camera construction embodying the present invention is shown in the attached drawing forming a part of this application, and in which.

In order that those persons skilled in the art may fully understand the nature and scope of this invention, I shall now give a detailed description thereof, with particular reference to the above-mentioned drawing, wherein like reference characters indicate like parts.

Figure 1:
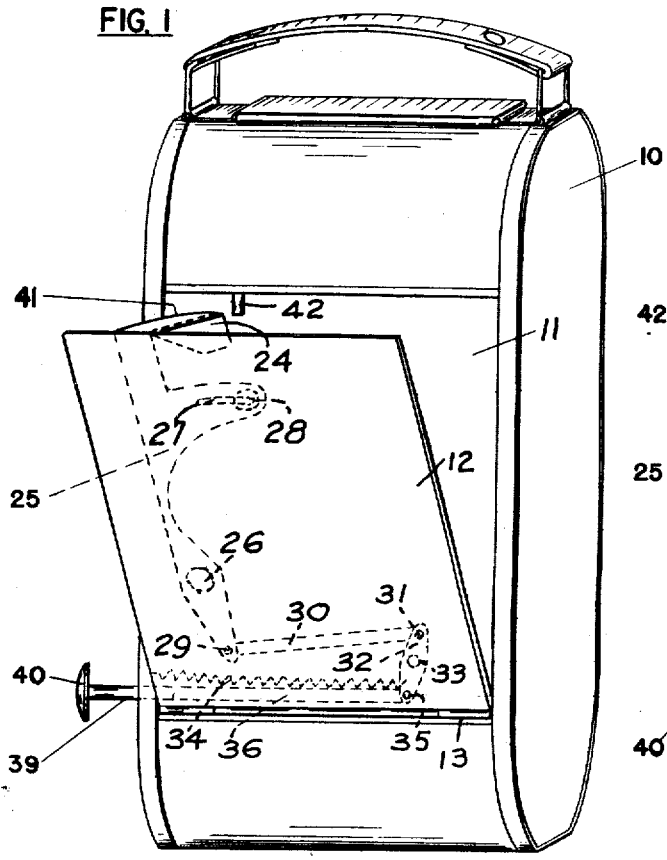
Figure 1 is a front perspective view of a folding camera with the camera bed partially open and with the camera front, lens, shutter, and bellows omitted for clarity.

The camera body 10 may be of any desired construction. The front wall of the body is provided with a rectangular opening 11 in the usual manner. A movable bed 12 is hinged to the body 10 at one edge of opening 11, as at 13. It will be understood that the bed 12 is movable between open and closed positions and that, when said bed is in its closed position, it will form a closure for the opening 11 in the front of the camera.

The camera is provided with the usual objective lens 14 (Figure 3) and shutter casing 15, which are preferably mounted on a movable camera front or plate 16. Camera front 16 with the lens and shutter is movable through the opening 11 between a retracted position within the camera body and an extended position over the camera bed. In the preferred form of my invention, this camera front and bed will be of the so-called "self-erecting front" type, in which the camera front 16 is automatically extended and retracted through movement of the bed 12 between open and closed positions respectively. Typical self-erecting front mechanisms are shown for example in the following patents: 1,793,925—Goldhammer; 2,005,820—Bornmann et al.; and 2,097,197—Lessler. Since the front erecting mechanism does not constitute an essential part of the present invention, this mechanism has been omitted from the drawing for the sake of clarity. It will be apparent that the invention is equally applicable to a camera of the older type in which the camera front is extended and retracted on tracks in the camera bed, after said bed has been opened.

When the camera bed is fully open, the camera front 16 will be positioned over or adjacent the outer end of bed 12. The shutter casing 15 is provided with a trigger 18 which is moved in the direction of arrow A (Figure 3) to operate the shutter. Trigger 18 in turn may be operated by an upstanding arm 24 on a lever 25 pivoted to the camera bed as at 26. In order to transmit movement from arm 24 to trigger 18, I have found it desirable to provide the slide 20, mounted on the camera front 16 by the pin and slot connections 21. Slide 20 has a forwardly projecting flange or arm 19 which engages trigger 18. Slide 20 also has a downwardly projecting arm 22 with a pin 23 which is engaged by arm 24 of lever 25.

Lever 25 may also be provided with an arcuate slot 27 which engages a pin 28 on the camera bed to guide and limit the movement of said arm. The opposite or inner end of arm 25 is pivoted at 29 to a link 30, which in turn is pivoted at 31 to one end of a second lever 32. Lever 32 is also pivoted to the camera bed as at 33. A return spring 34 may engage the other or inner end of lever 32 to urge said lever in a clockwise direction (with reference to Figures 1 and 3) and thereby hold lever 25 and arm 24 in the position shown in Figure 3, where arm 24 is ready to engage pin 23 and operate the shutter trigger 18. The inner end of lever 32 is also pivotally connected at 35 with a further link member 36, which is connected in turn with the rod 39 mounted in the camera body. In the construction shown in the drawing, rod 39 is mounted in a side wall of the camera near the point of hinging of the camera bed, and said rod is movable in a direction substantially parallel to the camera bed hinge. The outer end of rod 39 is provided with the button 40 which can be engaged by a finger of the operator.

Figure 3:
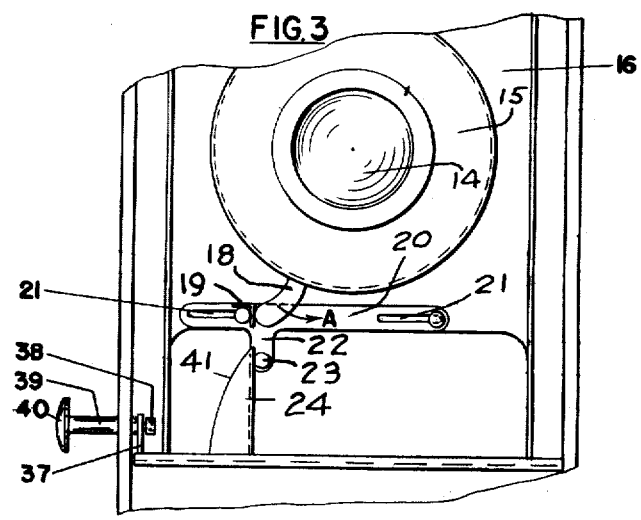
Figure 3 is a partial front view of the camera with the bed in open position, parts of the camera front supporting mechanism being omitted.

It will be understood from the foregoing description that movement of the operating member 40 from the position shown in Figures 1 and 3 will actuate the links and levers 36, 32, 30, and 25, and will cause arm 24 to move slide 20 and actuate the shutter trigger 18. After operation of the shutter, the spring 34 and the customary shutter trigger return spring (not shown) will restore the parts to their original position in preparation for a subsequent operation.

Figure 2:
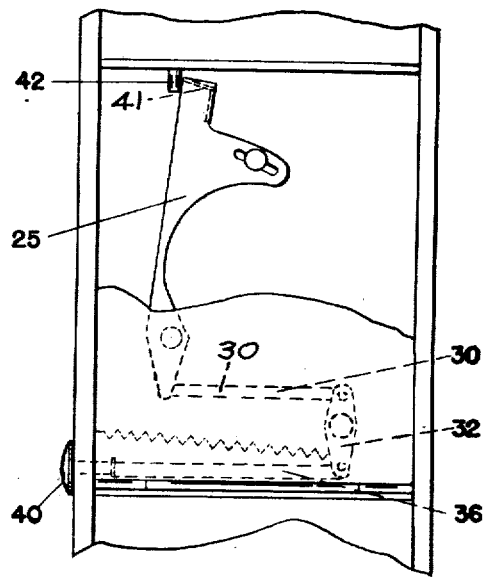
Figure 2 is a front view of the camera with the camera bed entirely closed, a portion of the bed being broken away to show the engagement of the parts according to the invention.

The end of lever 25 or arm 24 near the front of the camera bed, may be provided with a sloping cam surface 41 as shown in Figures 1 and 3. A control member 42 is mounted in the camera body near the edge of opening 11 which is opposite to or remote from the hinge 13. When the camera bed is closed, control member 42 will engage the cam surface 41 of lever 25 and will move lever 25 and in turn the other members 30, 32, 36, and 40 to the position shown in Figure 2. In other words, member 42 moves lever 25 because of the interengaging cam action and thereby retracts the operating member 40 to a position substantially flush with the side wall of the camera body.

This movement of lever 25 and operating member 40 is obviously not transmitted to the shutter trigger 18, since trigger 18 and slide 20 are retracted within the camera body when the bed is closed. The pin 23 of slide 20 is only engageable by arm 24 when the camera bed is fully open and the camera front fully extended.

Figure 4:
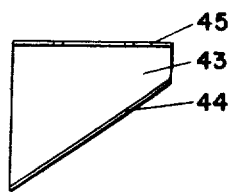
Figures 4 and 5 are detailed views of an alternate form of control member which can be used according to the present invention.
Figure 5:
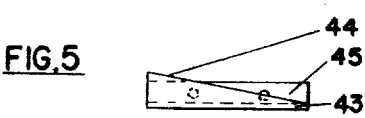

It will be obvious that instead of providing the cam surface 41 on lever 25, such a cam surface could be mounted in the body in place of the pin 42. In Figures 4 and 5 I have shown a cam member which could be used as the control member in this way. This cam member or plate 43 is provided with a sloping cam surface 44, which is adapted to engage and move the end of arm 25. Member 43 is also provided with the flange 45 which is fastened within the camera body in any suitable manner.

Although I have shown a very specific form of linkage between the operating member 40 and the shutter trigger 18, it will be apparent that the principle of the present invention is applicable to any such linkage which includes a movable member mounted near the end of the camera bed. It is only necessary that a control member 42 be positioned in the camera body opposite the camera bed hinge, where it will engage and move such a lever to retract the operating member when the bed is closed.

Since various equivalent forms of construction will be readily apparent to those persons skilled in the art, it is not my intention to limit myself to the exact mechanism shown in the drawing. All constructions within the spirit and scope of the attached claims are to be included.

Now therefore I claim:

1. A folding camera having a body including a front wall provided with an opening, a bed hinged to said body at one edge of said opening for movement between open and closed positions in the latter of which said bed forms a closure for said opening, a camera front movable through said opening between a retracted position when said bed is closed and an extended picture-taking position near the free end of said bed when the bed is open, a shutter and shutter operating member on said camera front, an actuating member mounted on said bed and movable with reference to said bed for engagement and operation of said shutter operating member when the camera front is extended over said bed, an operating member normally projecting from the camera, means connecting said operating member and said actuating member for movement of either member by the other, and a control member mounted in the body at an edge of said opening remote from the bed hinge, said control member engaging and moving said actuating member for retracting said operating member when said bed is moved to closed position.

2. A folding camera according to claim 1, wherein the control member is provided with a sloping cam surface for engagement with said control member.

3. A folding camera according to claim 1, wherein the control member is provided with a sloping cam surface for engagement with said actuating member.

4. A folding camera having a body including a front wall provided with an opening, a bed hinged to said body at one edge of said opening for movement between open and closed positions in the latter of which said bed forms a closure for said opening, a camera front movable through said opening between a retracted position when said bed is closed and an extended picture-taking position near the free end of said bed when the bed is open, a shutter, an actuating member mounted on said bed and movable with reference to said bed for engagement and operation of said shutter when the camera front is extended over said bed, an operating member normally projecting from the camera, means connecting said operating member and said actuating member for movement of either member by the other, and a control member mounted in the body at an edge of said opening remote from the bed hinge, said control member engaging and moving said actuating member for retracting said operating member when said bed is moved to closed position.

LEW W. LESSLER.

CERTIFICATE OF CORRECTION.

Patent No. 2,316,006.                                        April 6, 1943.
                        LEW W. LESSLER.

It is hereby certified that error appears in the printed specification of the above numbered patent requiring correction as follows: Page 2, second column, line 43, claim 2, for "control" read --actuating--; and that the said Letters Patent should be read with this correction therein that the same may conform to the record of the case in the Patent Office.

Signed and sealed this 14th day of December, A. D. 1943.

Henry Van Arsdale,
                                Acting Commissioner of Patents.
(Seal)